United States Patent [19]
Von Drygalski

[11] 3,980,148
[45] Sept. 14, 1976

[54] DEVICE FOR WEIGHING STATIONARY OBJECTS

[75] Inventor: Klaus Von Drygalski, Vasteras, Sweden

[73] Assignee: Allmanna Svenska Elektriska Aktiebolaget, Vasteras, Sweden

[22] Filed: May 1, 1975

[21] Appl. No.: 573,796

[30] Foreign Application Priority Data
May 24, 1974  Sweden .............................. 7406906

[52] U.S. Cl. ............................... 177/132; 177/253; 177/DIG. 9
[51] Int. Cl.² ....................................... G01G 21/02
[58] Field of Search ........... 177/244, 132, 151, 199, 177/210, 211, 253, 255, 260, 261, DIG. 9; 73/141 A

[56] References Cited
UNITED STATES PATENTS

| | | |
|---|---|---|
| 2,901,235 | 8/1959 | Bradley ............................... 177/211 |
| 3,072,209 | 1/1963 | Perry ................................... 177/179 |
| 3,621,927 | 11/1971 | Ormond .............................. 177/211 |

*Primary Examiner*—Joseph W. Hartary

[57] ABSTRACT

Weighing equipment for weighing stationary objects, such as containers, load platforms and the like, includes a base and a plurality of supports containing pressure sensitive load cells and each formed of an upper supporting part which is attached to the object and a lower support part which rests on the base. The two support parts of each support are formed of two portions of a spherical bearing having upper and lower bearing surfaces. One of the supports is a rigid support which permits no relative horizontal movement, another of the supports permits movement in one direction only and the other two supports permit movement in both directions.

3 Claims, 8 Drawing Figures

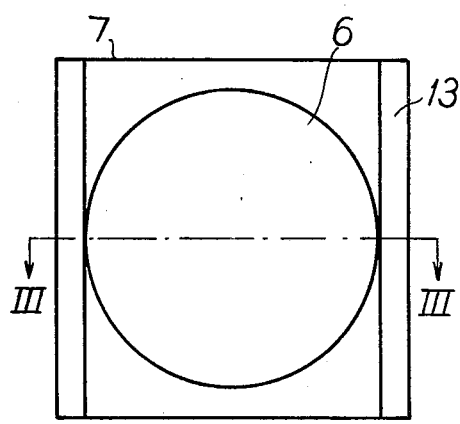
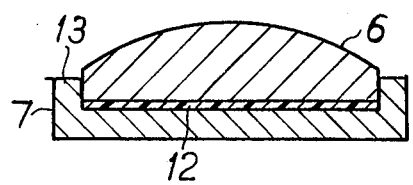
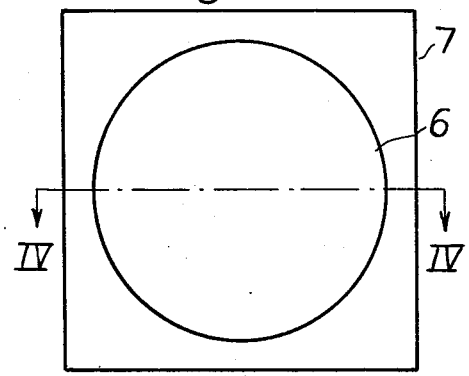
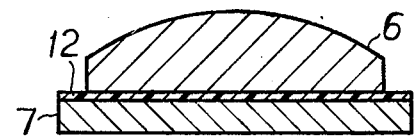
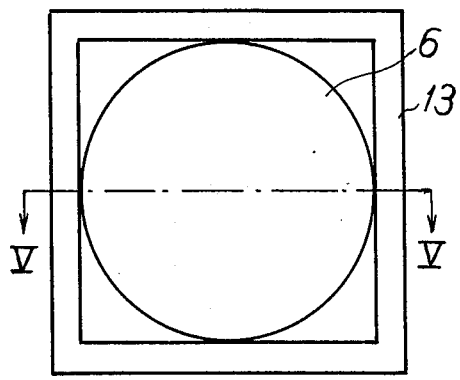
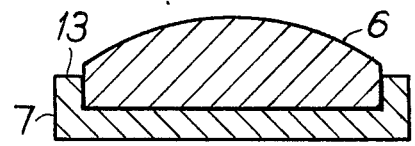

DEVICE FOR WEIGHING STATIONARY OBJECTS

BACKGROUND OF THE INVENTION

1. Field of the Invention

The invention relates to a device for weighing stationary objects, particularly large objects such as containers, load platforms and the like.

2. The Prior Art

In industry there is a frequent need to be able to weigh continuously stationary objects such as containers for various materials or goods, load platforms, and the like. Large objects or objects to be weighed may exhibit greatly varying conditions regarding the amount of contents to be weighed, the distribution of the contents within the object, and so on. Also the deformation and thermal expansion of the object may cause problems during the weighing.

SUMMARY OF THE INVENTION

The present invention relates to a device for weighing stationary and especially large and heavy objects such as containers, load platforms and the like, which are carried by supports containing pressure-sensing load cells and which consist of an upper supporting part which is fastened to the object and a lower supporting part which rests on a stationary and preferably horizontal base. Both the supporting parts are in contact with each other by means of a spherical bearing with an upper and a lower bearing surface.

According to the invention, at least one of the supports is a stationary support with the lower supporting part firmly connected to the base. The other supports are free supports, in which the lower supporting part has a base plate firmly connected to the base, whereas a bearing part — formed with the lower bearing surface — arranged on top of the base plate is mounted on the base plate in such a way that it is movable in at least one direction, that is, has at least one degree of freedom. Preferably, the free supports are constructed so that one of them has one degree of freedom, whereas the other supports have two degrees of freedom.

One condition for the load cells to indicate proper weights is that they are not exposed to edge pressures or lateral forces, but are loaded only perpendicularly to the contact surface. A stationary container for heavy goods must then stand rigidly, which implies that the supports are rigidly and well fastened to the container. However, the supports must be resilient in a horizontal direction but at the same time they should be so constructed that the load cells are affected in such a way that they can indicate the pressure correctly and are not exposed to harmful effects. Since at least one of the supports carrying the object is rigid, the object becomes fixed to the base at one point. In a scale platform, for example, one of its corners is fixed. The other corners which are supported by free supports with one or two degrees of freedom should be able to move, for example in accordance with temperature expansion, changed location of the cargo on the platform and the like. In this way unnecessary stresses in the platform are avoided.

BRIEF DESCRIPTION OF THE DRAWINGS

In the accompanying drawings,

FIG. 3a is a top view of the bottom part of a support with one degree of freedom and FIG. 3b is a section along the line III—III in FIG. 3a.

FIG. 4a and 4b show the same for a support where the bearing has two degrees of freedom, and FIG. 5a and FIG. 5b show the same for a rigid support.

DESCRIPTION OF THE PREFERRED EMBODIMENTS

Figure 1:
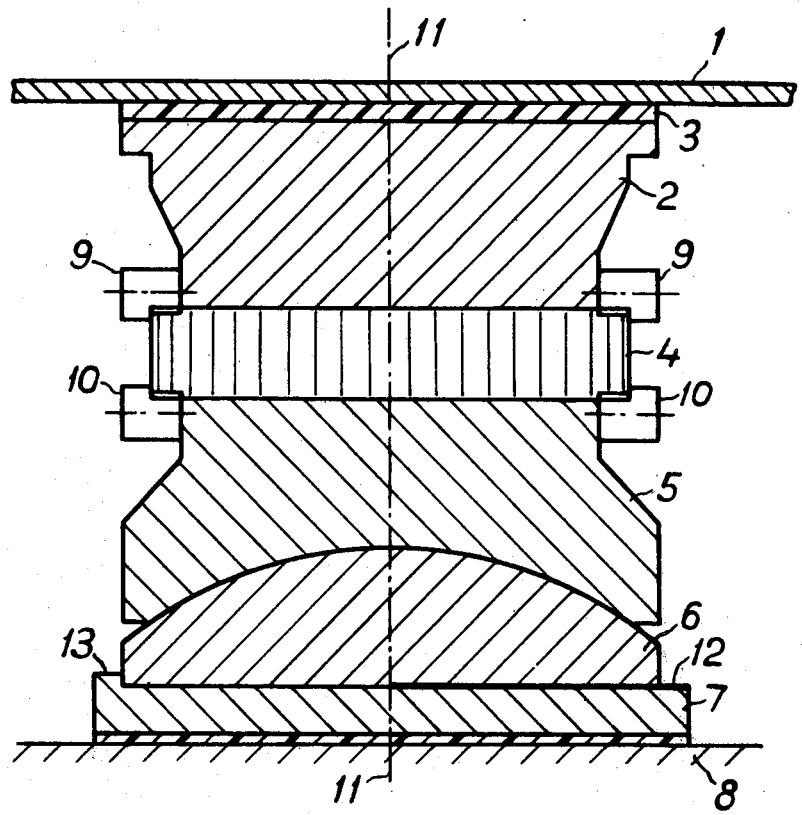
FIG. 1 shows a cross-section through a support.

In FIG. 1, 1 indicates the bottom of a container 14 or another object which is to be weighed. On the underside of the bottom a pressure block 2 is attached with the help of a cast adhesive compound 3. The underside of the pressure block, which makes contact with the upper side of the load cell 4, is well machined so that an even contact surface with the load cell is obtained. The load cell rests on the plane upper side of the upper part 5 of a spherical bearing, the lower part 6 of which is arranged on a base plate 7 which, in turn, lies on a rigid, preferably horizontal underlayer 8, where the plate is secured by a layer 3 of a cast adhesive compound. A support thus consists of the pressure block 2, the load cell 4, the upper bearing part 5, the lower bearing part 6 and the base plate 7.

In the example shown the bearing is constructed so that its lower part 6 is convex upwards and the upper part 5 is shaped as a downwardly bearing cup. The bearing can of course have the reverse shape, its lower part being shaped as a bearing cup and the upper part being convex downwardly.

The load cell 4 is attached to the pressure block 2 by means of blocks 9 fastened to the pressure block, and in a similar way the load cell is attached to the upper bearing part 5 by blocks 10. The pressure block, the load cell and the upper bearing part thus form a completely rigid unit.

FIG. 1 is divided into a right-hand and a left-hand portion by the dot-and-dash line 11. The right-hand portion shows that between the lower bearing part 6 and the pressure plate 7 there is inserted a layer 12 of a material having great wear resistance and a low coefficient of friction, for example polytetrafluorethylene known under the name Teflon. Such a support, where the lower bearing part 6 may slide on the base plate 7, hereafter is called a free support. The base plate can be provided with a protruding flange 13 13, as shown at the left-hand portion of the figure. If such a flange is provided on two opposite sides of a rectangular or square base plate, or if a rail is fastened to the middle of the lower bearing part 6 and runs in a slot in the base plate 7, the lower bearing part is able to move freely in one direction, that is, the bearing has one degree of freedom (FIGS. 3a and 3b). If there is no flange at all, the bearing has two degrees of freedom (FIGS. 4a and 4b). If the flange 13 is arranged around the whole base plate, the bearing will have no degree of freedom (FIGS. 5a and 5b) and such a support is called a rigid support.

Figure 2:
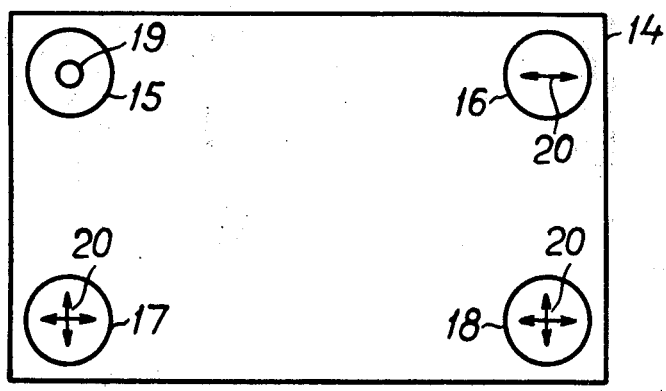
FIG. 2 shows schematically how a container is carried by four supports.

FIG. 2 shows schematically how a container 14 is mounted on four supports. Of these supports 15 is a rigid support, which is marked by a central ring 19. The support 16 is a free support with one degree of freedom marked by the double arrow 20. The supports 17 and 18 are free supports with two degrees of freedom marked by two crossed double arrows 20. Here the lower bearing part 6 is able to move freely in the horizontal plane on the layer 12.

By means of the rigid support 15, the container is fixed at one point to the underlayer. The partly free support 16 prevents the container from turning around the rigid support. The other two supports permit all movements in the horizontal plane. Any angular adjustments at the points of support of the container are taken up by the bearing 5,6.

In the embodiment shown and described, it has been assumed that only one bearing is used. It is possible, however, to apply a bearing at the upper end of the support as well. In this arrangement the pressure block is constructed as a lower bearing part and an upper bearing part is attached to the bottom 1 of the container.

I claim:

1. Weighing equipment for weighing stationary objects comprising a rigid base and a plurality of supports containing pressure sensitive load cells and each of which includes an upper supporting part which is attached to the object and a lower supporting part which rests on the base, a spherical bearing formed of upper and lower mating portions having upper and lower bearing surfaces, one of said bearing surfaces being concave and the other convex, said portions being attached one to each of said supporting parts and engaging each other along a spherical surface, at least one of the supports being a rigid support (15) with the lower supporting part (6, 7) rigidly connected to the base (8), the other supports (16, 17, 18) being free supports, in which the lower supporting part includes a base plate (7) rigidly connected to the base and a bearing member (6) arranged on top of the base plate and formed with a lower bearing surface, and means mounting the bearing member on the base plate (7) for movement with respect thereto in at least one direction.

2. Weighing equipment according to claim 1, having means mounting one of the free supports (16) for one degree of freedom and two other free supports (17, 18) for two degrees of freedom.

3. Weighing equipment according to claim 1, in which the load cell (4) is arranged in the upper supporting part.

* * * * *